FIG. I.

INVENTORS
PERCY L. JULIAN &
ARTHUR MAGNANI
BY
ATTORNEYS

Oct. 20, 1964   P. L. JULIAN ETAL   3,153,646
PROCESS FOR THE PRODUCTION OF 11β,12β-EPOXYPREGNANE-3,20-DIONE
Filed March 21, 1957   2 Sheets-Sheet 2

R$_9$ = AN ALIPHATIC HYDROCARBON GROUP HAVING 1 TO 5 CARBON ATOMS

R$_{10}$ = AN ALIPHATIC HYDROCARBON GROUP HAVING 1 TO 5 CARBON ATOMS OR AN ALIPHATIC ω CARBOXY HYDROCARBON HAVING 2 TO 5 CARBON ATOMS

⌇ = A BOND IN THE α OR β POSITION

INVENTORS
PERCY L. JULIAN &
ARTHUR MAGNANI
BY
ATTORNEYS

United States Patent Office 3,153,646
Patented Oct. 20, 1964

3,153,646
PROCESS FOR THE PRODUCTION OF 11β,12β-EPOXYPREGNANE-3,20-DIONE
Percy L. Julian, Oak Park, and Arthur Magnani, Wilmette, Ill., assignors, by mesne assignments, to Smith Kline & French Laboratories, Philadelphia, Pa., a corporation of Pennsylvania
Filed Mar. 21, 1957, Ser. No. 647,465
3 Claims. (Cl. 260—239.55)

This invention relates to novel steroid compounds which have utility as useful pharmacological agents and as intermediates. This invention relates as well to processes for preparing the novel steroids.

The compounds of this invention have the following structural formula:

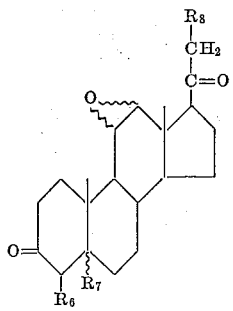

in which:

$R_6$ and $R_7$ individually represent hydrogen and, when taken together, represent a carbon to carbon bond;

$R_8$ is —H, —OH, an aliphatic acyloxy group having from 2 to 6 carbon atoms, an aliphatic ω carboxyacyloxy group having from 3 to 6 carbon atoms, preferably hemisuccinyloxy, or an alkali metal salt of an ω carboxyacyloxy group having from 3 to 6 carbon atoms;

The designation "ξ," as used herein, represents a bond in the α or β position.

It will be understood that the above structural formula, as used herein and in the claims, covers allopregnanes as well as pregnanes and $\Delta^4$ pregnenes.

The principal pharmacological activity of these compounds is as central nervous system depressants. They are useful, for example, as sedatives, anesthetics and analgetics. They also have utility as valuable intermediates. In addition to having these activities in humans, they are useful as general anesthetics for laboratory animals such as mice or rats.

Advantageous compounds as far as depressant activity is concerned are the ring A saturated 11β,12β-epoxy compounds in the pregnane series, for instance compounds of the following structural formula:

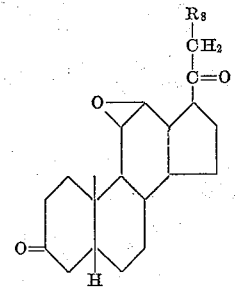

in which:

$R_8$ is hydroxyl, hydrogen, an aliphatic acyloxy group having from 2 to 4 carbon atoms, an aliphatic ω carboxyacyloxy group having from 3 to 4 carbon atoms, preferably hemisuccinyloxy, or an alkali metal salt of an ω carboxyacyloxy group having from 3 to 4 carbon atoms.

Preferred compounds are where $R_8$ is hydrogen or sodium succinyl. 11β,12β-epoxypregnane-3,20-dione-21-ol-sodium succinate is particularly useful for application where a soluble depressant is desirable, for instance intravenous anesthesiology.

The compounds of this invention also have utility as intermediates in the preparation of known physiologically active steroids. For example, the 11β,12β-epoxypregnane-3,20-dione and 11β,12β-epoxyallopregnane-3,20-dione members of this series have utility as intermediates in the synthesis of the pregnane and allopregnane 3,11,20-triones which are recognized as valuable for the synthesis of the corticoid steroids. For instance, the 11,12-epoxy ring is opened with a hydrohalic acid, such as by hydrobromic acid. The 11-hydroxyl group is oxidized for instance with chromic acid in aqueous acetic acid. The resulting 12-bromotrione is debrominated with zinc and acetic acid to form the desired pregnane-3,11,20-trione and allopregnane-3,11,20-trione.

The 21-hydroxylated members of the series are also useful in preparing biologically active compounds, such as corticosterone acetate. A typical route is starting from 11β,12β-epoxypregnane-3,20-dione-21-ol acetate, a compound of this invention, by opening the 11β,12β-epoxy ring with hydrogen bromide to give the 12-bromo-11-ol which is oxidized with chromic oxide in pyridine and debrominated with zinc-acetic acid to give pregnane-3,11,20-trione-21-ol 21-acetate. The $\Delta^4$ double bond may then be inserted by bromination at 4 followed by dehydrohalogenation with pyridine, all following the method of Reichstein, Helv. Chim. Acta, 26, 747 (1943), to give the desired corticosterone acetate.

The 11β,12β-epoxypropgesterone of this invention is converted to valuable steroids having progestational activity, for instance 9-dehydroprogesterine, by opening the epoxy ring with hydrogen halide, removing the halide atom with Raney nickel and dehydrating with thionyl chloride to introduce the $\Delta^{(9,11)}$ moiety [Shoppee and Reichstein, Helv. Chim. Acta, 24, 351 (1941)].

Other objects of this invention will become apparent on reading the following description in conjunction with the drawings in which.

With respect to the following description, it is desired to point out that reduction providing an OH group in the 12-position results in a mixture of compounds, some having the OH bonded by a bond in the α position and some by a bond in the β position.

It is also desired to point out that the ring A saturated steroid compounds disclosed as intermediates in preparing the compounds of this invention exist in either the 3α,5β or 3β,5α form. The structural formulas in the description and claims are intended to cover both of these forms of ring A saturated steroids.

Where the term "aliphatic" is employed herein, the preferred form is an alkane.

PREPARATION OF 11β,12β EPOXIDE STARTING MATERIALS

The starting materials for the process of this invention, namely, the 11β,12β-epoxides of Formula XI (FIGURE 2) are prepared as fully disclosed in our copending application, Serial No. 643,353, filed March 1, 1957, now Pat. No. 2,940,991. Their preparation is shown schematically in FIGURE 1 to which reference will now be made.

The starting materials are either well known or obvious to those skilled in the art. The desired pregnane-3α,12α,-20β-triol starting material is produced from the known pregnane-3α,12α-diol-20-one diacetate which can be obtained from desoxycholic acid, by reduction of the 20-keto group using either a chemical reducing agent, such as a bimetallic anhydride, for instance sodium borohydride in an aqueous organic solvent, such as aqueous methanol or lithium aluminum hydride in a dry organic solvent, such as ethyl ether or tetrahydrofuran, or catalytically, for instance with hydrogen in the presence of a hydrogenation catalyst, such as Raney nickel in alcoholic solution. The resulting diacetate is hydrolyzed to the 3α,12α,20β-triol with an alkaline solution, for instance with potassium hydroxide or sodium hydroxide in aqueous methanol.

The known allopregnane-3β-ol-12,20-dione acetate, obtained from hecogenin by typical genin degradative oxidation of the pseudoacetate with chromium oxide, is similarly reduced to give the allopregnane-3β,12β,20β-triol starting material.

Figure 1:
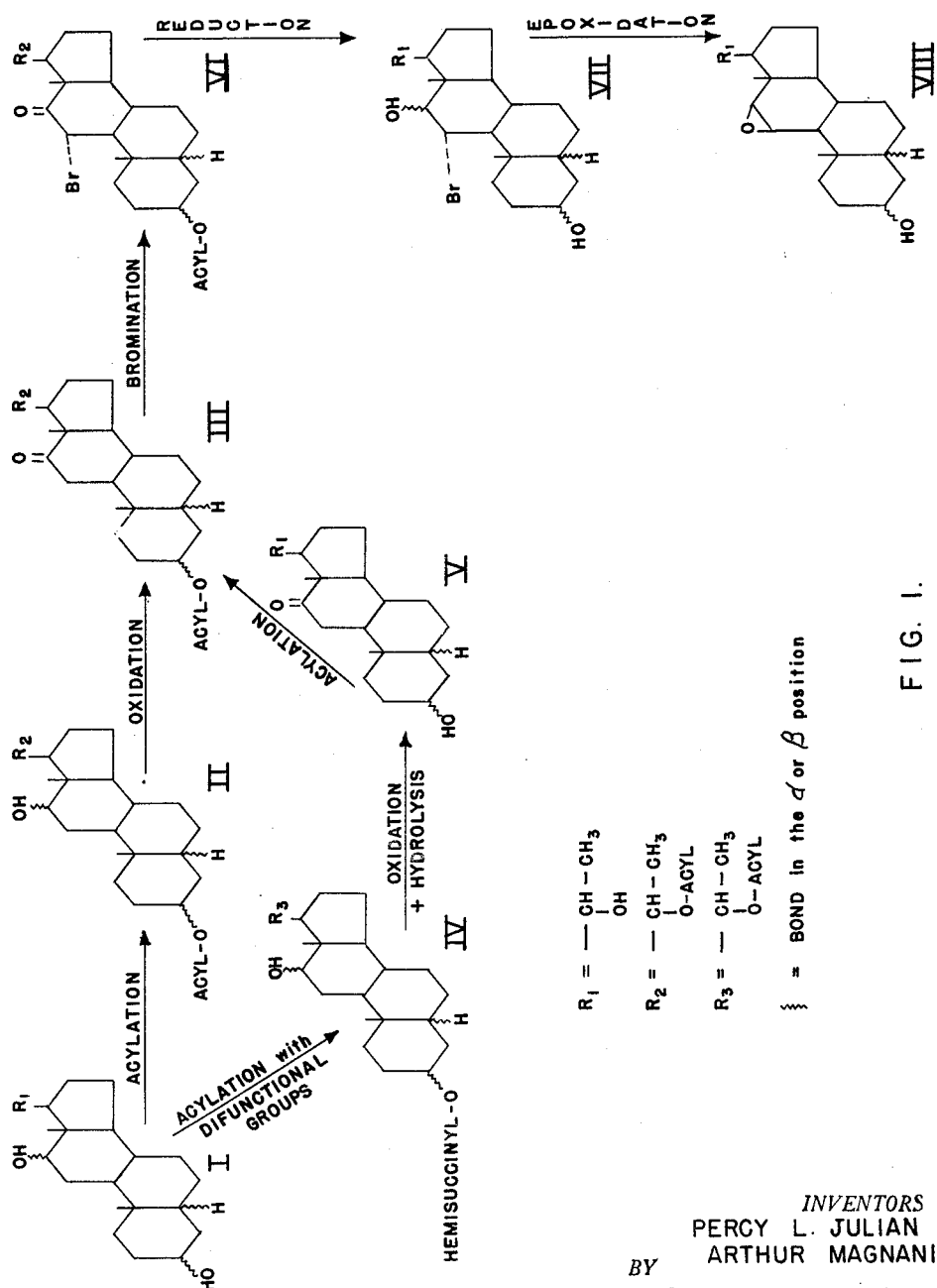
FIGURE 1 is a schematic representation of the process for obtaining the starting materials required for the process of this invention.
Figure 2:
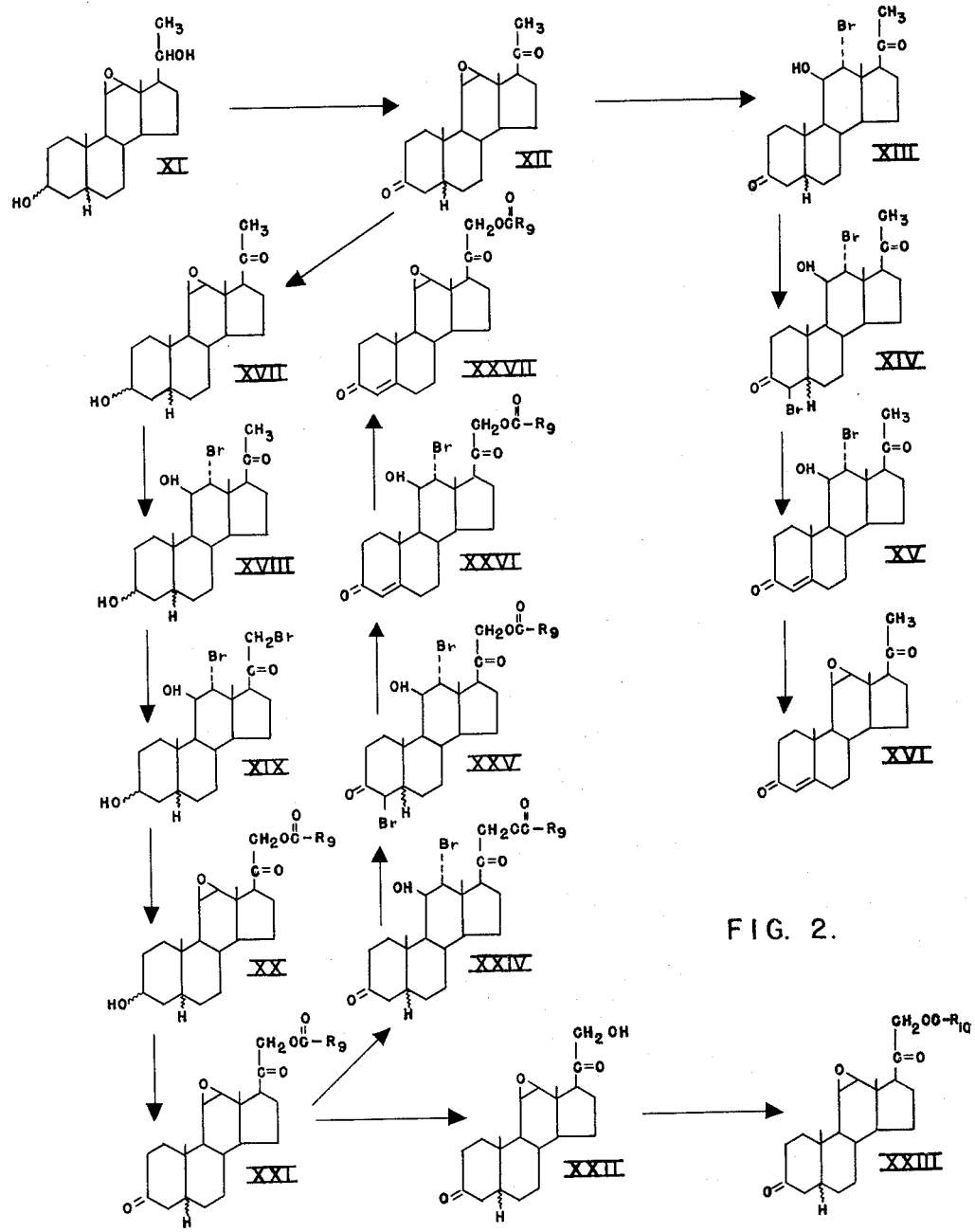
FIGURE 2 is a schematic representation of the process in accordance with this invention.

As illustrated in FIGURE 1, the pregnane or allopregnane-triol (I) selected, depending upon the end product trione desired, is preferentially oxidized at position 12. Blocking the hydroxyl groups in the 3 and 20 position is essential in order to accomplish a clean-cut reaction. This is accomplished by blocking these positions with a suitable acyl group, for example, either an aromatic acyl group such as benzoyl, hemiphthalate or toluyl or by a lower alkanoyl group such as propionyl, butyryl or preferably by an acetyl or hemisuccinyl group. Acylation is accomplished by acylating with the appropriate acyl anhydride or acyl chloride in basic solution such as in an excess of a tertiary amine, for instance pyridine, collidine or picoline or in an inert solvent such as dimethylformamide, acetone or dimethylacetamide with about one equivalent of an acid binding agent, for instance pyridine, tributylamine or picoline. The resulting 3,12,20β-triol-3,20-diacylate (II) then is oxidized with a suitable oxidizing agent, for example, chromic acid in aqueous acid solution, for example, aqueous acetic acid or chromic oxide in basic solution, for example, in pyridine solution, to form the corresponding 3,20β-diol-12-one diacylate (III).

When the 3,20-blocking acyl groups contain centers reactive under the bromination conditions later employed in the process, it is necessary to hydrolyze the blocking groups after the oxidation step and reacylate to introduce nonreactive blocking groups, preferably acetate. As an example of a blocking group reactive to bromine, the hemidibasic esters are mentioned, for instance the hemisuccinyl and the hemiphthalate moieties. By way of specific example, the procedure where the hemisuccinyl moiety is employed is as follows: Diacylation with, for example, succinyl anhydride in an excess of tertiary amine, such as pyridine, or in an inert solvent, such as dimethylformamide, acetone or dioxane with an equivalent of acid binding agent, for example, pyridine, tributylamine or picoline, normally first produces a mixture of the mono- and dihemisuccinates. The monohemisuccinate upon retreatment, produces a further quantity of the dihemisuccinate (IV). The thus formed 3,20-dihemisuccinate (IV) then is oxidized with an oxidizing agent, as described above, preferably with chromic acid in aqueous acetic acid solution or with chromic oxide in pyridine solution to the desired 3,20β-diol-12-one dihemisuccinate. The protective groups in the 3 and 20-positions then are hydrolyzed by alkali, for example, potassium or sodium hydroxide in alcohol, for example, methanol or isopropanol or in an aqueous alcohol mixture, for example, aqueous methanol, ethanol, isopropanol or butanol. The resulting 3,20β-diol-12-one (V) can then be diacylated with nonreactive acyl groups inert to bromine (using the same procedure as described above in connection with the 3,20 acylation of 3,12,20β-triol (I) to the diacylate II) to produce the corresponding 3,20β-diol-12-one diacylate (III) in which there are no acyl groups reactive during the bromination step. The better yields obtained by using this alternative procedure are due to the favorable solubility characteristics of the hemisuccinate derivatives.

The diacylate (III) containing the inert to bromine 3,20 blocking agents is brominated in an inert organic solvent, for example, chloroform, chloroform-acetic acid or ethylene dichloride by treatment with bromine at moderate temperature, from about 15° C. to about 40° C., preferably at about 25° C. The bromination can be catalyzed by and hence is preferably carried out in the presence of HBr. A mixture of 11α (VI) and 11β-bromo isomers results. The 11α isomer is required for the formation of the 11,12-epoxide; preferably, therefore, the organic extract from the bromination reaction may be concentrated and the isomers separated by fractional crystallization from, for example, methanol or ethanol. The resulting 11α - bromo-3,20β-diol-12-one diacylate (VI) then is reduced with a bimetallic hydride in an organic solvent such as sodium borohydride in an aqueous organic solvent inert to reduction, such as aqueous methanol or ethanol, or lithium aluminum hydride in a dry organic solvent, such as diethyl ether, dibutyl ether or tetrahydrofuran at moderate temperatures, preferably from about 15° C. to about 40° C. to form a mixture of the 11α-bromo-3,12,20β-triol (VII) and its 3,20 acylate. If desired, the mixture of the acylated and free triol can be reacylated using the appropriate acyl anhydride or acyl chloride, for example, those set forth above in connection with the formation of the diacylate Compound III in a tertiary base such as pyridine or in an inert solvent such as dimethylformamide, acetone or dioxane employing about one equivalent of an acid binding agent, for example, pyridine, tributylamine or picoline. If desired, the acyl groups can be removed by hydrolysis before the reduction step.

The triol (VII) its 3,20 acylate or a mixture thereof then is converted to the 11β-12β-epoxy-3,20β-diol (VIII) with a strong dehydrohalogenating agent such as a strong base such as caustic alkali, for example, potassium hydroxide or sodium hydroxide in aqueous methanol, isopropanol or ethanol or such as collidine or such as silver oxide-pyridine. This compound is the desired starting material XI (FIGURE 2) for the process claimed herein.

PREPARATION OF COMPOUNDS OF THIS INVENTION

The compounds of this invention are prepared by several routes, all of which have the same initial step, namely, oxidation of the 11β,12β-epoxy-3,20β-diol (Compound XI), for instance with chromic acid in acid solution for instance such as in acetic acid or chromic oxide in basic solution for instance in an excess of pyridine. The product of this oxidation step is the 11β,12β-epoxy-3,20-dione (XII), which has great value both as an intermediate in the preparation of the other compounds of this invention and as a pharmacologically active agent, particularly as a sedative and anesthetic.

The Δ⁴ analogues of this series are advantageously prepared by opening the 11,12-epoxy ring of XII with a hydrohalic acid, for instance hydrobromic or hydrochloric acid, in aqueous-organic solution, such as aqueous ethanol or acetone, or with hydrogen chloride or bromide in an anhydrous organic solvent, for instance benzene or dioxane. The resulting 11,12-halohydrin (XIII) is brominated at the 4 position (using, for example, bromine in an inert organic solvent such as methylene chloride or dimethylformamide) to form Compound XIV and dehydrohalogenated at the 4,5 position with a dehydrohalogenating agent, such as lithium chloride in dimethylformamide to form the 12α-bromo-Δ⁴-pregnene-11β-ol- 3,20-dione (XV). Other known methods of introducing the 3-keto-$\Delta^4$ system can be used, for example, dehydrohalogenation of 3-keto-4-bromo compound with tertiary amines such as pyridine or collidine. This compound is then reacted with alkali such as potassium carbonate, in aqueous methanol to form the desired 11$\beta$,12$\beta$-epoxy-$\Delta^4$-pregnene-3,20-dione (XVI).

The 21-acylates, which also are members of this series, are prepared by reducing the 3-keto group of 11$\beta$,12$\beta$-epoxypregnane-3,20-dione (XII), for instance with a bimetallic hydride, such as sodium borohydride in aqueous methanol under basic conditions. The resulting compound, 11$\beta$,12$\beta$-epoxy-3-ol-20-one has unexpected central nervous system depressant activity and will be claimed in a copending application. The 11,12 - epoxy-3-ol (XVII) is reacted with a hydrohalic acid, for example, hydrobromic acid, in aqueous-organic solution, such as aqueous ethanol or acetone, or with hydrogen chloride or bromide in an anhydrous organic solvent, for instance benzene or dioxane to open the epoxy ring and form the 12-halo-3,11$\beta$-diol-20-one (XVIII) which, in turn, is brominated at the 21-position using, for example, bromine in an inert organic solvent such as glacial acetic acid, methylene chloride or dimethylformamide preferably in the presence of a catalytic amount of hydrogen bromide. The resulting 12,21-dibromo-3,11$\beta$-diol-20-one (XIX) is then reacted with a suitable alkali salt of the desired acylate, for instance sodium acetate, sodium propionate, potassium valerate or sodium caproate, in a non-reactive aqueous miscible solvent, such as acetone or methyl ethyl ketone to insert a 21-acyloxy group. Preferably, a mild base such as sodium carbonate or potassium bicarbonate is added to the reaction mixture to assist in forming the 11,12-epoxy ring in the same reaction mixture. Alternatively, this reaction may be run independently.

The resulting compounds (XX) are oxidized preferably with chromic acid or chromic oxide in acid solution or basic solution as herein above described to form the desired members of this invention, the 11$\beta$,12$\beta$-epoxy-21-ol-3,20-dione acylates (XXI).

These compounds, for instance the 11$\beta$,12$\beta$-epoxy-21-ol-3,20-dione 21-acetate (XXI), are hydrolyzed at the 21-position under mild conditions (employing, for example, a sodium methoxide-methanol solution) to give the 11$\beta$,12$\beta$-epoxy-21-ol-3,20-dione (XXII) a particularly useful intermediate which may be further acylated to obtain other esters (XXXIII) of this invention, such as the hemisuccinate, methyl succinate, acetate, benzoate or isovalerate. This is the preferred way to form esters of dibasic acids and higher monobasic fatty acids.

Where esters are formed from dibasic acids, hemiesters result. It will be understood that alkali metal salts can then be formed by reaction with the unreacted carboxyl group, for example, sodium or potassium salts.

The epoxy compounds of this invention containing both the 21-acyloxy group and the $\Delta^4$ unsaturation are advantageously prepared from the 11$\beta$,12$\beta$-epoxy-21-ol-3,20-dione esters (XXI), such as the 21-acetate. The epoxy ring is opened as described above, for instance with an aqueous alcohol solution of hydrobromic acid. The resulting 11,12-halohydrin (XXIV) is then brominated at position 4 (using, for example, bromine in an inert organic solvent such as methylene chloride or dimethylformamide) to form the Compound XXV and then dehydrohalogenated either with dimethyl formamide as previously described or with an organic base such as pyridine. The product, 12$\alpha$-bromo-$\Delta^4$-pregnene-11$\beta$,21-diol-3,20-dione ester (XXVI), is then dehydrohalogenated with a mild alkaline agent such as sodium bicarbonate or potassium bicarbonate in acetone at reflux to give the the desired epoxy-$\Delta^4$ esters (XXVII). These esters can be hydrolyzed under mild conditions (employing, for example, a sodium methoxide-methanol solution) to substitute a hydroxy group in the 21-position in place of the acyloxy group.

The $\alpha,\alpha$-epoxy analogues are prepared by reacting the corresponding $\Delta^{11,12}$ compounds with a peracid, such as peracetic acid or preferably monoperphthalic acid in an organic solvent inert to the oxidizing agent, such as ethyl ether.

These, $\alpha,\alpha$-epoxy analogues also have utility as intermediates in addition to their sedative activity. The $\alpha,\alpha$-epoxy rings of the 3,20-diones of this invention can be advantageously opened with hydrohalic acids to give 11-halo-12-hydroxy derivatives. These compounds can be further treated to introduce the 3-keto-$\Delta^{4,5}$ system, thereby producing a series of biologically active progesterone analogues, for example, having glucocorticoid and desoxycorticosterone-like activity.

For instance, 11$\alpha$,12$\alpha$-epoxypregnane - 3,20 - dione is reacted with alcoholic hydrobromic acid to open the epoxide ring and form the 11-bromo-12-hydroxy compound which can be selectively brominated at 4 with one equivalent of bromine and dehydrohalogenated using dimethyl formamide to give 11$\alpha$-bromo-12$\beta$-hydroxyprogesterone, a compound with appreciable glucocorticoid activity.

EXAMPLE I

*Oxidation of 11$\beta$,12$\beta$-Epoxypregnane-3,20-Diol*

(a) ACID SOLUTION

A mixture of 50 g. of 11$\beta$,12$\beta$-epoxypregnane-3$\alpha$,20$\beta$-diol, 50 cc. of pyridine, 400 cc. of acetic acid and 20 cc. of water is cooled to about 15° C. A solution consisting of 40 g. of chromic acid, 50 cc. of water and 100 cc. of acetic acid is added rapidly and the mixture cooled to about 15° C. The resulting mass is permitted to warm up to 25° C., at which temperature it is agitated for four hours. The mass is diluted with 4 l. of water and extracted with methylene chloride. The solvent solution is washed with water, 10% aqueous caustic soda and finally with water until the washings are neutral to litmus. The washed extract is evaporated to dryness. The residue is dissolved in methanol. The resultant solution, concentrated to a volume of 60 cc., is set aside to crystallize slowly; 24.1 g. of 11$\beta$,12$\beta$-epoxypregnane-3,20-dione, M.P. 139–142° C. Recrystallization from methanol gives crystals which melt at 143–5° C.

(b) BASIC SOLUTION

A solution of 2 g. of 11$\beta$,12$\beta$-epoxypregnane-3$\alpha$,20$\beta$-diol in 20 cc. of pyridine is added to a suspension of 3 g. of chromic oxide in 30 cc. of pyridine [prepared as described in J. Am. Chem. Soc., 75, 427 (1953)]. The mixture is agitated for 45 minutes and then permitted to stand for about 16 hours. The dark solution containing a dark precipitate is diluted with 400 cc. of water and filtered. The clarified filtrate is extracted with methylene chloride and the extract washed with water, aqueous caustic soda and finally with water. The washed extract is concentrated to remove methylene chloride and then distilled with steam to remove pyridine. The residue is taken up in methylene chloride and evaporated to dryness. The oil which remains is crystallized by the addition of ether; 1.35 g. of epoxydione, M.P. 137–139° C. Upon recrystallization from acetone, the product melts at 142–144° C.

EXAMPLE II

*12$\alpha$-Bromopregnane-11$\beta$-Ol-3,20-Dione*

To a solution of 34.3 g. of the epoxydione of Example I in 450 cc. of acetone, 80 cc. of 4 N hydrobromic acid is added. The mixture is agitated and cooled as the bromohydrin rapidly precipitates with the evolution of heat. The slurry is filtered and washed with 50% acetone. After drying, 40.5 g. of 12$\alpha$-bromopregnane-11$\beta$-ol-3,20-dione, M.P. 239–240° C. are obtained.

In an analogous fashion, by treatment of an acetone solution of the epoxydione with aqueous hydrochloric acid, the chlorohydrin is obtained. By use of aqueous hydrofluoric acid, the fluorohydrin is prepared.

EXAMPLE III

*4,12-Dibromopregnane-11β-Ol-3,20Dione*

A portion of a solution of 11 g. of bromine dissolved in 100 cc. of dimethylformamide is added to a suspension of 25.6 g. of the bromohydrin prepared in Example II above, in 250 cc. of dimethylformamide with 400 mg. of p-toluene sulfonic acid. The mixture is agitated and heated to 45° C. to initiate the reaction. After 15 minutes, the mass becomes decolorized and the balance of the bromine solution is added to the warm (35–40° C.) mixture over a period of two hours. The mass is agitated for 15 minutes and then diluted with 400 cc. of water (slowly and while cooling). The resulant slurry is filtered. The filter cake is washed with water. After drying, 28 g. of 4,12-dibromopregnane-11β-ol-3,20-dione, M.P. 205° C. (dec.) is obtained. Upon recrystallization from acetone, the product melts at 218–220° C.

EXAMPLE IV

*12α-Bromo-Δ⁴-Pregnene-11β-Ol-3,20-Dione*

A mixture of 21.8 g. of the dibromo compound of Example III, 175 cc. of dimethylformamide, and 5.7 g. of lithium chloride is heated in an atmosphere of nitrogen at 94–96° C. for three hours. The pale yellow solution, diluted with 125 cc. of water, forms a slurry which is cooled and filtered. In this manner, 14.5 g. of 12α-bromo-Δ⁴-pregnene-11β-ol-3,20-dione, M.P. 218–220° C. is obtained.

EXAMPLE V

*11β,12β-Epoxy-Δ⁴-Pregnene-3,20-Dione*

A mixture of 2.97 g. of the bromohydrin of Example IV, 30 cc. of methanol, 6 cc. of water and 1.5 g. of potassium carbonate crystals is heated under reflux for 15 minutes. The mass is concentrated to the boiling point and diluted with water. The mixture is extracted with methylene chloride. The extract is washed with water and evaporated to dryness. The residue, crystallized from acetone, yields 11β,12β-epoxy-Δ⁴-pregnene-3,20-dione, M.P. 168–170° C.

EXAMPLE VI

A solution of 2.0 g. of Δ¹¹-pregnene-3,20-dione, prepared as described by Hegner and Reichstein, Helv. Chim. Acta, 26, 724 (1943), in 50 cc. of ethyl ether is swirled as a 10% excess of monoperphthalic acid in ether is added. The mixture is allowed to stand at about 25° C. for 24 hours, shielded from direct sunlight. The solvent is taken off by evaporation and the residue recrystallized from ether-methanol to yield 11α,12α-epoxypregnane-3,20-dione.

EXAMPLE VII

A mixture of 5.0 g. of 11β,12β-epoxyallopregnane-3α-20β-diol, 5 cc. of pyridine, 40 cc. of acetic acid and 5 cc. of water is cooled externally while a solution of 4 g. of chromic acid is aqueous acetic acid is added. The reaction mixture is allowed to stand at room temperature for five hours with agitation. After dilution with water, the mixture is extracted exhaustively with methylene chloride. The organic extracts are washed with alkali solution and water. The dried methylene chloride extract is concentrated to dryness in vacuo. The residue is recrystallized from methanol to yield the pure solid, 11β,12β-epoxyallopregnane-3,20-dione.

EXAMPLE VIII

*12-Bromopregnane-3α,11β-Diol-20-One*

A solution of 5 g. of 11β,11β-epoxypregnane-3,20-dione, made as in Example I, in 80 cc. of methanol cooled to 25° C. is treated with a solution consisting of 200 mg. of sodium borohydride, 10 cc. of pyridine, 10 cc. of methanol and 1.5 cc. of 10% aqueous sodium hydroxide. The mixture warms spontaneously to 34° C. and a clear solution results. The mass is agitated for 15 minutes and 500 cc. of water added slowly. The resultant slurry is permitted to stand for one hour, then filtered. The filter cake is washed with water and dried. The resultant product, M.P. 130–140° C. (combined with a small amount of product obtained by extraction with ether of the mother liquor) is dissolved in methanol. The resulting solution, after filtration, is concentrated to about 15 cc. volume. Five cubic centimeters of 4 N hydrobromic acid are added and the resultant solution set aside to crystallize. The slurry is filtered. The filter cake is washed with aqeous methanol. The crude 12-bromopregnane-3α,11β-diol-20-one melts at 180–183° C. Recrystallization from methanol gives bromohydrin melting at 187–189° C. (dec.).

EXAMPLE IX

*12,21-Dibromopregnane-3α,11β-Diol-20-One*

A solution of 5 g. of bromine in 60 cc. of methylene chloride is added dropwise over 20 minutes to a solution of 12.5 g. of the bromohydrin from Example VIII in 400 cc. of methylene chloride and 1 cc. of methanol. The mass is agitated for 5 minutes, and then washed with water, aqueous sodium bicarbonate and, finally, with water. The washed solution is concentrated to incipient crystallization and cooled to below 5° C. In this fashion, 12,21-dibromopregnane-3α11β-diol-20-one, M.P. 180–182° C. (dec.) is obtained.

EXAMPLE X

*11β,12β-Epoxypregnane-3α,21-Diol-20-One 21-Acetate*

A mixture consisting of 1.5 g. of the 12,21-dibromo derivative, prepared as in Example IX above, 25 cc. of acetone, 3.75 g. of potassium acetate and 330 mg. of sodium bicarbonate is heated under reflux for five hours. The acetone is removed by distillation and the residue diluted with water. The resultant mass is extracted with ether. The ether extract is washed with water. The ether solution, dried over anhydrous sodium sulfate, is evaporated to a low volume. By the addition of petroleum ether, crystallization of the product, 11β,12β-epoxypregnane-3α-21-diol-20-one 21-acetate, 157–159° C. is induced.

EXAMPLE XI

*11β,12β-Epoxypregnane-21-Ol-3,20-Dione Acetate*

A solution of 1.27 g. of the epoxy-21-acetate, prepared as in Example X above, in 5 cc. of pyridine is added to a mixture of 1.5 g. of chromium trioxide and 15 cc. of pyridine, using about 2 cc. of pyridine to assist in the transfer. The mixure is agitated at ambient temperature for about 20 hours, and then ether and water is added. The ether layer is washed with water and filtered. The solution is washed with water, dilute sodium hydroxide and, finally, with water. The washed solution is evaporated to dryness, taking off the last traces of solvent in vacuo. The residue is crystallized from ether to give 11β,12β-epoxypregnane-21-ol-3,20-dione acetate, M.P. 117–119° C.

The 11,12-epoxy-21-acetate is converted, by reaction with halogen acids such as hydrobromic acid to the 11β-hydroxy-12-halo derivative which, upon oxidation with chromic acid followed by dehalogenation with zinc and acetic acid, results in pregnane-21-ol-3,11,20-trione acetate. Introduction of the 4,5 double bond in a known manner converts this compound into corticosterone acetate.

EXAMPLE XII

11β,12β-Epoxypregnane-21-Ol-3,20-Dione

Several drops of sodium methoxide-methanol solution are added to a solution of 500 mg. of the epoxydione acetate from Example XI in 10 cc. of methanol. After standing at room temperature overnight, the solution is neutralized with a drop of dilute acetic acid and concentrated in vacuo. The residue is recrystallized from ether to give crystals of 11β,12β-epoxypregnane-21-ol-3,20-dione.

EXAMPLE XIII

11β,12β-Epoxypregnane-21-Ol-3,20-Dione Propionate

Following the procedure of Example X, 2.0 g. of the 12,21-dibromo compound is reacted with 4.2 g. of sodium propionate and 400 mg. of sodium bicarbonate to give 11β,12β-epoxypregnane-3α-21-diol-20-one 21-propionate which, in turn, is oxidized with 1.7 g. of chromium trioxide in 20 cc. of pyridine to give the 21-propionate of 11β,12β-epoxypregnane-21-ol-3,20-dione.

EXAMPLE XIV

11β,12β-Epoxypregnane-21-Ol-3,20-Dione Hemisuccinate

A solution of 1.0 g. of the 21-ol (prepared as in Example XII) in 25 cc. of acetone with 0.5 g. of dry pyridine is mixed with 0.5 g. of succinic anhydride. After standing overnight at room temperature, the reaction mixture is quenched in ice water and filtered. The resulting solid is recrystallized from methanol-petroleum ether to give crystals of the hemisuccinate ester.

A solution of 500 mg. of the hemisuccinate is dissolved in 100 cc. of dry ethyl ether. A small piece of sodium is added. With warming and swirling, a solid forms which is separated by filtration and washed with ether to separate the sodium salt.

EXAMPLE XV

A solution of 5.0 g. of 11β,12β-epoxypregnane-21-ol-3,20-dione acetate, prepared as in Example XI, in 25 cc. of purified dioxane is mixed with 10 cc. of hydrogen bromide-dioxane solution. After standing at room temperature for several hours, the solution is evaporated in vacuo to leave a crude residue which, after recrystallization from methanol, gives 12-bromopregnane-11β,21-diol-3,20-dione 21-acetate.

To a solution of 5.3 g. of the 12-bromo compound in 50 cc. of dimethylformamide with a trace of p-toluene sulfonic acid, a solution of 2.2 g. of bromine in 25 cc. of dimethylformamide is added dropwise with agitation. The mixture is agitated with slight warming until the bromine color has largely disappeared. Quenching in water gives crude 4,12-dibromopregnane-11β,21-diol-3,20-dione 21-acetate. A solution of 5.0 g. of this dibromo compound in 50 cc. of pyridine is heated to dehydrobrominate at 4,5 in the standard manner. The resulting compound, 1.5 g. is heated in a suspension of 25 cc. of acetone, 3.7 g. of potassium acetate and 330 mg. of sodium bicarbonate at reflux with stirring for several hours. After taking off the acetone in vacuo, the residue is diluted with water and extracted into ether. The dried ether extracts are evaporated and diluted with petroleum ether to separate 11β,12β-epoxy-Δ⁴-pregnene-3,20-dione-21-ol acetate.

A solution of 750 mg. of the acetate in 25 cc. of acetone-water is made slightly basic with several drops of sodium hydroxide solution. After stirring at room temperature shortly, the reaction mixture is neutralized with dilute acetic acid and evaporated to give crystals of 11β,12β-epoxy-Δ⁴-pregnene-3,20-dione-21-ol.

What is claimed is:
1. The method of making chemical compounds selected from the group consisting of 11β,12β-epoxypregnane-3,20-dione and 11β,12β-epoxyallopregnane-3,20-dione which comprises oxidizing a compound having the following formula:

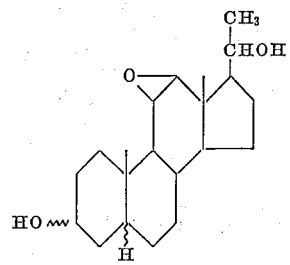

in which the designation "ξ" represents a bond in a position selected from the α and β positions using an oxidizing agent selected from the group consisting of chromic acid in acetic acid and chromic oxide in pyridine.

2. The method of forming a chemical compound having thte following formula:

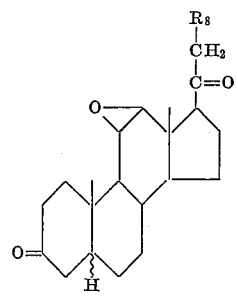

in which $R_8$ is a member selected from the group consisting of an alkanoyloxy group having from 2 to 4 carbon atoms, and ω-(carboxy) alkanoyloxy group having from 3 to 4 atoms, and an alkali metal salt of an ω-(carboxy) alkanoyloxy group having from 3 to 4 carbon atoms; and the designation "ξ" represents a bond in a position selected from the α and β positions, and which comprises oxidizing with an oxidizing agent selected from the group consisting of chromic acid in acetic acid and chromic oxide in pyridine a compound having the following formula:

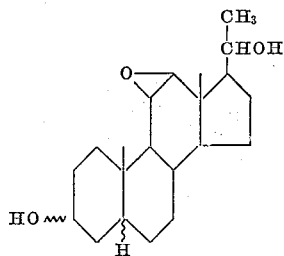

to form the corresponding 3,20-dione, reducing the 3-keto group with sodium borohydride in aqueous methanol to form the corresponding 3-ol,20-one, reacting the 3-ol with a hydrohalic acid in a solvent selected from the group consisting of aqueous ethanol, aqueous acetone, benzene and dioxane to open the epoxy ring and form the corresponding 12α-halo-11β-ol, brominating using bromine in an organic solvent selected from the group consisting of glacial acetic acid, methylene chloride and dimethylformamide the thus formed compound at the 21-position, reacting in acetone the thus formed 12,21-dibromo compound with an alkali metal salt of the desired acylate to insert a 21-acyloxy group and reform the 11β,12β-epoxy ring, and oxidizing using an oxidizing agent selected from the group consisting of chromic acid in acetic acid and chromic oxide in pyridine the 3-hydroxyl group to form the desired 11β,12β-epoxy-21-ol-3,20-dione acylate.

3. The method of making 11β,12β-epoxypregnane-3,20-dione which comprises oxidizing using an oxidizing agent selected from the group consisting of chromic acid in acetic acid and chromic oxide in pyridine a compound having the following formula:
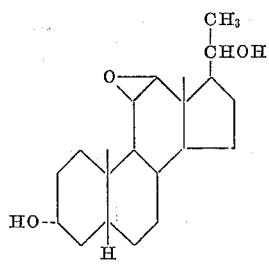
References Cited in the file of this patent
UNITED STATES PATENTS
| | | |
|---|---|---|
| 2,403,683 | Reichstein | July 9, 1946 |
| 2,649,402 | Murray et al. | Aug. 18, 1953 |
| 2,782,211 | Wettstein | Feb. 19, 1957 |
| 2,871,160 | Johnson et al. | Jan. 27, 1959 |
| 3,075,969 | Herz et al. | Jan. 29, 1963 |
OTHER REFERENCES
Herz et al.: J.A.C.S., vol 78, pp. 2017–18, May 5, 1956.